United States Patent
Kühne

(10) Patent No.: US 10,359,840 B2
(45) Date of Patent: Jul. 23, 2019

(54) METHOD FOR OPERATING A VIRTUAL REALITY SYSTEM, AND VIRTUAL REALITY SYSTEM

(71) Applicant: AUDI AG, Ingolstadt (DE)

(72) Inventor: Marcus Kühne, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/075,373

(22) PCT Filed: Jan. 25, 2017

(86) PCT No.: PCT/EP2017/051456
§ 371 (c)(1),
(2) Date: Aug. 3, 2018

(87) PCT Pub. No.: WO2017/133933
PCT Pub. Date: Aug. 10, 2017

(65) Prior Publication Data
US 2019/0041982 A1 Feb. 7, 2019

(30) Foreign Application Priority Data
Feb. 5, 2016 (DE) .................. 10 2016 001 313

(51) Int. Cl.
*G06F 3/01* (2006.01)
*G06T 19/00* (2011.01)

(52) U.S. Cl.
CPC .............. *G06F 3/012* (2013.01); *G06F 3/011* (2013.01); *G06T 19/003* (2013.01)

(58) Field of Classification Search
CPC .................................................. H04N 5/7491
See application file for complete search history.

(56) References Cited

U.S. PATENT DOCUMENTS

| 2014/0240351 | A1 | 8/2014 | Scavezze et al. |
| 2016/0275722 | A1* | 9/2016 | Bretschneider ....... G06T 19/006 |
| 2016/0300395 | A1* | 10/2016 | Bretschneider ....... G06T 19/006 |

(Continued)

FOREIGN PATENT DOCUMENTS

| CN | 105159450 | 12/2015 |
| CN | 105302288 | 2/2016 |
| WO | 2014/133919 A1 | 9/2014 |

OTHER PUBLICATIONS

English Translation of International Preliminary Report on Patentability dated Aug. 16, 2018 from International Patent Application No. PCT/EP2017/051456, 8 pages.

(Continued)

*Primary Examiner* — Priyank J Shah
(74) *Attorney, Agent, or Firm* — Staas & Halsey LLP

(57) ABSTRACT

A speed at which a person who has donned a pair of virtual reality glasses performs a change of position within a detection space is detected in a virtual reality system. If it is detected that the change of position takes place within a prescribed subregion of the detection space, a virtual speed that is greater by a prescribed factor than the detected speed of the person is prescribed and a virtual observation position within a virtual environment is changed in accordance with the prescribed virtual speed, during which the virtual reality glasses are used to display a virtual object arranged within the virtual environment from the changing virtual observation position.

17 Claims, 1 Drawing Sheet

(56) References Cited

U.S. PATENT DOCUMENTS

2016/0313790 A1\* 10/2016 Clement ................. G06F 3/011
2018/0224930 A1\* 8/2018 Folmer ................. A63F 13/211

OTHER PUBLICATIONS

Cirio et al., "The Magic Barrier Tape: a Novel Metaphor for Infinite Navigation in Virtual Worlds with a Restricted Walking Workspace", Proceedings of the 16$^{th}$ ACM Symposium on Virtual Reality Software and Technology, Nov. 18-20, 2009, pp. 155-162.
Zhang et al., "Human Sensitivity to Dynamic Translational Gains in Head-Mounted Displays", Proceedings of the 2$^{nd}$ ACM Symposium on Spatial User Interaction, Oct. 4-5, 2014, pp. 62-65.
German Office Action dated Oct. 13, 2016 from German Patent Application No. 10 2016 001 313.3, 12 pages.
International Search Report dated Mar. 23, 2017 from International Patent Application No. PCT/EP2017/051456, 2 pages.
PCT/EP2017/051456, Jan. 25, 2017, Marcus Kühne, Audi AG.
10 2016 001 313.3, Feb. 5, 2016, Marcus Kühne Audi AG.
Chinese Office Action dated Feb. 20, 2019 from Chinese Patent Application No. 201780009752.6, with English translation of summary of Examiner's comments, 8 pages.

\* cited by examiner

METHOD FOR OPERATING A VIRTUAL REALITY SYSTEM, AND VIRTUAL REALITY SYSTEM

CROSS REFERENCE TO RELATED APPLICATIONS

This application is a U.S. national stage of International Application No. PCT/EP2017/051456, filed on Jan. 25, 2017. The International Application claims the priority benefit of German Application No. 10 2016 001 313.3 filed on Feb. 5, 2016. Both the International Application and the German Application are incorporated by reference herein in their entirety.

BACKGROUND

Described herein is a method for operating a virtual-reality system, and a virtual-reality system.

A virtual reality can be presented by a virtual-reality system, wherein virtual reality usually denotes the presentation and simultaneous perception of reality in terms of its physical properties in interactive virtual surroundings generated by a computer in real time.

Usually, virtual-reality systems include at least one pair of virtual-reality glasses. Virtual-reality glasses are a specific type of a so-called head-mounted display, which is a visual output appliance worn on the head. It presents images on a screen close to the eyes or projects the images directly onto the retina. Here, virtual-reality glasses additionally have sensors for capturing the movement of the head as well. Using this, the display of calculated graphics can be matched to the movements of a wearer of the virtual-reality glasses. As a result of the physical proximity, the displayed screens of head-mounted displays appear significantly larger than free-standing monitors and, in the extreme case, even cover the entire visual view of the user. Since the respective displays of virtual-reality glasses follow all head movements of the wearer by way of the posture of the head, the wearer has the impression of moving directly in a visual landscape produced by a computer.

Such virtual-reality systems may have a capture device, by which a position of a wearer of virtual-reality glasses can be captured in a capture space. Depending on the captured position of the person, the content displayed by using the virtual-reality glasses can be adapted in such a way that the wearer of the virtual-reality glasses can move relative to a virtual object within displayed virtual surroundings. The capture space, within which a position of the wearer of the virtual-reality glasses is reliably capturable, may be relatively small on account of technical and/or cost-related boundary conditions. The wearer of the virtual-reality glasses can move virtually only in a restricted region of the virtual surroundings if the wearer does not wish to leave the capture space. By way of example, a problem arising here may be that the wearer of the virtual-reality glasses cannot go around the displayed virtual object and consequently cannot assess it, either, from any virtual observation position without departing from the capture space.

SUMMARY

Described herein is a method for operating a virtual-reality system and a virtual-reality system, by which a wearer of virtual-reality glasses is allowed to change their virtual position in relation to a virtual object substantially as desired within virtual surroundings.

In the method described herein for operating a virtual-reality system, a velocity at which a person wearing virtual-reality glasses undertakes a change in position within a capture space is captured. Should a change in position be captured within a predetermined portion of the capture space, a virtual velocity which is greater by a predetermined factor than the captured velocity of the person is predetermined. A virtual observation position within virtual surroundings is changed according to the predetermined virtual velocity, wherein a virtual object disposed within the virtual surroundings is displayed in the meantime from the changing virtual observation position by using the virtual-reality glasses.

The method described herein allows a person to move within a relatively small capture space and nevertheless be able to cover relatively large distances within virtual surroundings. Even if the capture space within which a reliable capture of a position of a wearer of the virtual-reality glasses can take place should be relatively small on account of technical boundary conditions or for reasons of costs, the method described herein thus allows a wearer of the virtual-reality glasses to virtually cover relatively large distances within the displayed virtual surroundings. This is because a movement is implemented virtually within the virtual surroundings at the virtual velocity which is greater than the captured velocity of the person by a predetermined factor as soon as the person moves within the predetermined portion of the capture space. By way of example, provision can be made for the person to move twice as fast within the virtual surroundings than they actually move in real life. By way of example, if the wearer of the virtual-reality glasses only moves one meter within one second in real life, the person moves two meters, for example, within the virtual surroundings within the same amount of time, i.e., within one second.

Nevertheless, the wearer of the virtual-reality glasses can as a result easily go around a virtual object which has relatively large virtual dimensions in comparison with the real dimensions of the capture space, without the person reaching the boundaries of the capture space. Depending on which factor is predetermined for increasing the virtual velocity, the person moreover can virtually move themselves to a great distance from the displayed virtual object in relation to the dimensions of the capture space. Consequently, the wearer of the virtual-reality glasses can also explore a very large virtual area within the virtual surroundings, even in a relatively small capture space area. In addition to the advantage that the wearer of the virtual-reality glasses can cover relatively large virtual distances, even in the case of a very small capture space, an advantage arising here is that the capture space as such can be designed to be relatively compact and the technical devices required to capture the position of the person can be designed to be relatively simple and cost-effective.

An advantageous embodiment provides for a second virtual velocity, which corresponds to the captured velocity of the person, to be predetermined should the change in position be captured outside of the predetermined portion of the capture space, wherein the virtual observation position is changed according to the predetermined second virtual velocity within the virtual surroundings and wherein the virtual object disposed within the virtual surroundings is displayed in the meantime from the changing virtual observation position by using the virtual-reality glasses. Thus, if the person wearing the virtual-reality glasses moves within the capture space outside of the predetermined portion, real captured changes in position of the person are implemented one-to-one within the virtual surroundings. Thus, if the person moves forward at 4 km/h in reality, the person also moves forward virtually at 4 km/h. Thus, for as long as the person moves outside of the predetermined portion but nevertheless within the capture space, they can move virtually in a very authentic fashion relative to the virtual object since movements of the person are implemented one-to-one within the virtual surroundings. However, as soon as the person moves into the predetermined portion of the capture space and moves within this predetermined portion, there is, once again, a type of accelerated movement within the virtual surroundings, as already described above, since the virtual velocity in this case is once again predetermined, the virtual velocity being greater than the captured real velocity of the person by the predetermined factor. Thus, depending on where the person moves within the capture space, they can move either in an accelerated fashion or completely normally within the virtual surroundings in order to be able to assess the displayed virtual object from very different viewing angles.

A further advantageous embodiment provides for the portion to be predetermined in the form of an outer region which surrounds an inner region of the capture space. Thus, the person can move entirely naturally within the virtual surroundings within the inner region of the capture space as specified since the real movements are implemented one-to-one within the virtual surroundings. As soon as the person moves within the outer region, by contrast, the person moves faster within the virtual surroundings than they actually do in reality. The advantage of predetermining the portion in the form of the outer region which surrounds the inner region of the capture space lies in the fact that, for example, the person wearing the virtual-reality glasses is prevented from leaving the capture space. This is because as soon as the person moves in the outer region, they cover greater distances within the virtual surroundings than they actually do in reality.

According to a further advantageous embodiment, provision is made for a virtual portion corresponding to the predetermined portion to be displayed within the virtual surroundings by using the virtual-reality glasses. Thus, when the virtual-reality glasses are put on, the person can identify at all times how they have to move where in order to carry out an accelerated movement within the virtual surroundings. Even though the person cannot see their real surroundings when the virtual-reality glasses are put on, showing the virtual portion corresponding to the predetermined portion indicates to the person in a simple manner where they have to move to in order to obtain, firstly, the accelerated virtual movement and, secondly, the completely normal virtual movement, i.e., a one-to-one implementation of the real movement.

In a further advantageous configuration, provision is made for the change in the virtual observation position to occur at least substantially synchronously in time with the change in position of the person. Thus, if the wearer of the virtual-reality glasses moves, e.g., one meter to the right within one second in reality, they likewise move synchronously in time, i.e., within the same second, to the right within the virtual surroundings. As a result of the temporal synchronicity of the real movement and the virtual movement, the immersion of the wearer of the virtual-reality glasses can be improved.

A further advantageous embodiment provides for the factor to be predetermined to be larger with increasing virtual dimensions of the virtual object, for example in the horizontal direction. By way of example, if an automobile is displayed in the form of the virtual object, the factor is selected to be smaller than if, for example, a truck is displayed. Thus, it is possible to ensure independently of the size of the object to be displayed virtually that the person wearing the virtual-reality glasses can go around the virtual object in a comfortable and simple manner without leaving the capture space, even in the case of a relatively small capture space.

According to a further advantageous embodiment, provision is made for the factor to be predetermined to be larger with increasing virtual dimensions of the virtual object in relation to the capture space. As a result, it is possible to take care of the technical and geometric boundary conditions of the capture space in a simple manner since the person can move ever faster within the virtual surroundings in relation to their real propagation velocity as the size of the displayed virtual object increases in relation to the size of the real capture space. By way of example, if the capture space is narrow in comparison with the width of the virtual object to be displayed, the factor in the case of a movement of the person in the width direction of the capture space is selected to be large. If, at the same time, the length of the capture space, for example, is relatively large in relation to the length of the virtual object in this case, the factor in the case of a movement in the longitudinal direction of the capture space is selected to be smaller than in the case of a movement of the person in the width direction of the capture space. Independently of the dimensions of the capture space in the longitudinal direction and the width direction, this therefore is able to ensure that the person can go around the displayed virtual object in a simple manner, without leaving the capture space.

In a further advantageous configuration, provision is made for a virtual movement direction, along which the virtual observation position is changed, to be predetermined in such a way that it corresponds to a movement direction of the change in position of the person. Thus, if the person moves forward, for example, they also move forward virtually within the virtual surroundings. This significantly simplifies the virtual inspection of the virtual surroundings, and hence also the observation of the displayed virtual object, since the person effectively moves naturally within the virtual surroundings—apart from the possibly virtually increased inspection velocity. This also contributes to an increase in the immersion.

Moreover, provision is made according to a further advantageous embodiment for only a horizontal velocity component of the virtual velocity to be increased by the predetermined factor and for a vertical velocity component of the virtual velocity to correspond to a vertical velocity component of the velocity of the person. Thus, if a person moves up and down, for example, they move up and down within the virtual surroundings at the same velocity, independently of their position within the capture space. By contrast, if the person moves forward, backward or sideways, they move forward, backward or sideways with a greater virtual velocity within the virtual surroundings—provided they are moving within the predetermined portion of the capture space. The movement within the virtual surroundings which possibly might feel unnatural in the case of the accelerated virtual movement per se on account of the increased virtual velocity thus only arises in the case of a horizontal movement of the person. This is because in a vertical direction, the real movements of the person are always implemented one-to-one, even in the virtual surroundings. Despite the increase in the virtual movement velocity, this at least partly assists a representation of the virtual surroundings close to reality since at least movements in the vertical direction are implemented very realistically. By way of example, if the person crouches down from standing in order to change their vertical virtual observation position within the virtual surroundings, this is carried out entirely naturally since the real vertical change in position of the person is implemented one-to-one in a virtual vertical movement of the person within the virtual surroundings.

The virtual-reality system includes virtual-reality glasses and a capture device for capturing a velocity at which a person wearing virtual-reality glasses undertakes a change in position within a capture space. Moreover, the virtual-reality system includes a control device, which is configured to predetermine a virtual velocity which is greater than the captured velocity of the person by a predetermined factor should the change in position be captured within a predetermined portion of the capture space. Moreover, the control device is configured to change a virtual observation position within virtual surroundings according to the predetermined virtual velocity and in the meantime actuate the virtual-reality glasses to display a virtual object disposed within the virtual surroundings from the changing virtual observation position. Advantageous configurations of the method described herein should be considered to be advantageous configurations of the virtual-reality system, wherein the virtual-reality system carries out the method operations described herein.

Further advantages, features and details of the disclosure emerge from the following description of example embodiments, and on the basis of the drawings. The features and feature combinations described above in the description and the features and feature combinations described below in the description of the drawings and/or only shown in the drawings can be used not only in the respectively described combination but also in other combinations or on their own, without departing from the scope of the disclosure.

BRIEF DESCRIPTION OF THE DRAWING

These and other aspects and advantages will become more apparent and more readily appreciated from the following description of example embodiments, taken in conjunction with the accompanying drawings.

DETAILED DESCRIPTION

Reference will now be made in detail to example embodiments which are illustrated In the accompanying drawings, wherein equivalent or functionally equivalent elements are provided with the same reference signs throughout.

Figure 1:
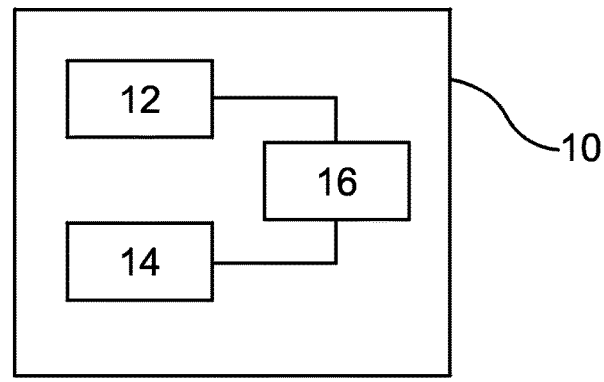
FIG. 1 is a schematic illustration of a virtual-reality system which includes virtual-reality glasses, a capture device for capturing a person wearing the virtual-reality glasses, and a control device for actuating the virtual-reality glasses.

A virtual-reality system 10 is shown in a schematic illustration in FIG. 1. The virtual-reality system 10 includes virtual-reality glasses 12, a capture device 14 and a control device 16. Very different virtual objects, for example virtual motor vehicles and the like, can be displayed within the virtual surroundings by using the virtual-reality system 10. The capture device 14 is configured to capture a position and a change in position of the virtual-reality glasses 12. Moreover, the capture device 14 is configured to capture a velocity at which a person wearing the virtual-reality glasses 12 undertakes a change in position. The control device 16 is configured to actuate the virtual reality glasses 12 depending on the captured velocity, at which the wearer of the virtual-reality glasses 12 actually moves.

Figure 2:
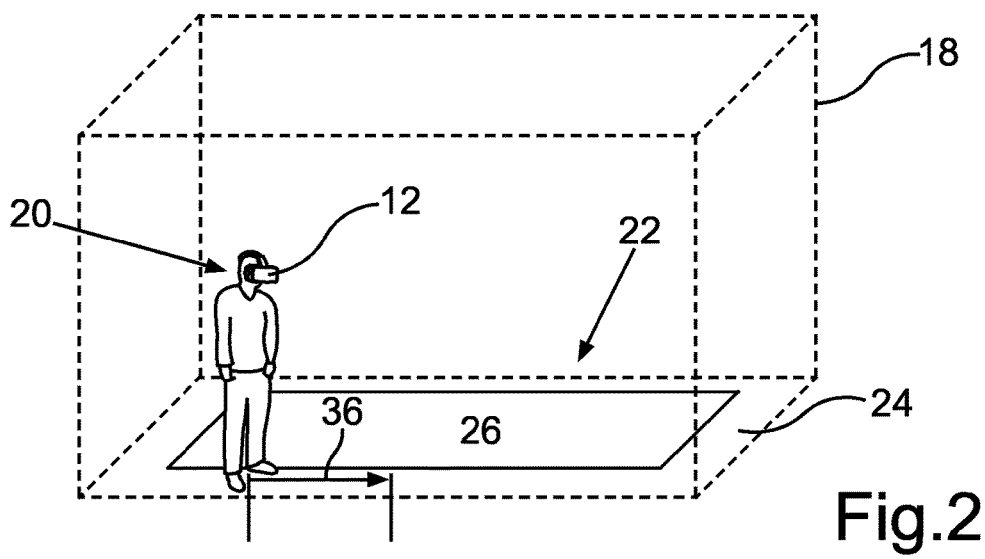
FIG. 2 is a schematic perspective view of a capture space, within which a person wearing the virtual-reality glasses is disposed.

FIG. 2 shows a capture space 18, in which a person 20 wearing the virtual-reality glasses 12 is disposed, in a schematic perspective view. The person 20 can move freely along an inspection area 22 of the capture space 18. For as long as the person 20 wearing the virtual-reality glasses 12 is situated within the capture space 18, i.e., does not leave the inspection area 22, the capture device 14 can reliably capture changes in position of the person 20 by virtue of the capture device 14 capturing changes in position of the virtual-reality glasses 12. By way of example, the capture device 14 can have laser-based or infrared-based capture devices, by which the position of virtual-reality glasses 12 can be captured within the capture space 18. Accordingly, the position of the person 20 can also be deduced depending on the captured position of the virtual-reality glasses 12. Moreover, a movement velocity of the virtual-reality glasses 12 and hence also a movement velocity of the person 20 can be deduced by way of capturing the position of the virtual-reality glasses 12.

The inspection area 22 is subdivided into a portion 24 in the form of an outer region and into an inner region 26, the latter being surrounded by the portion 24.

Figure 3:
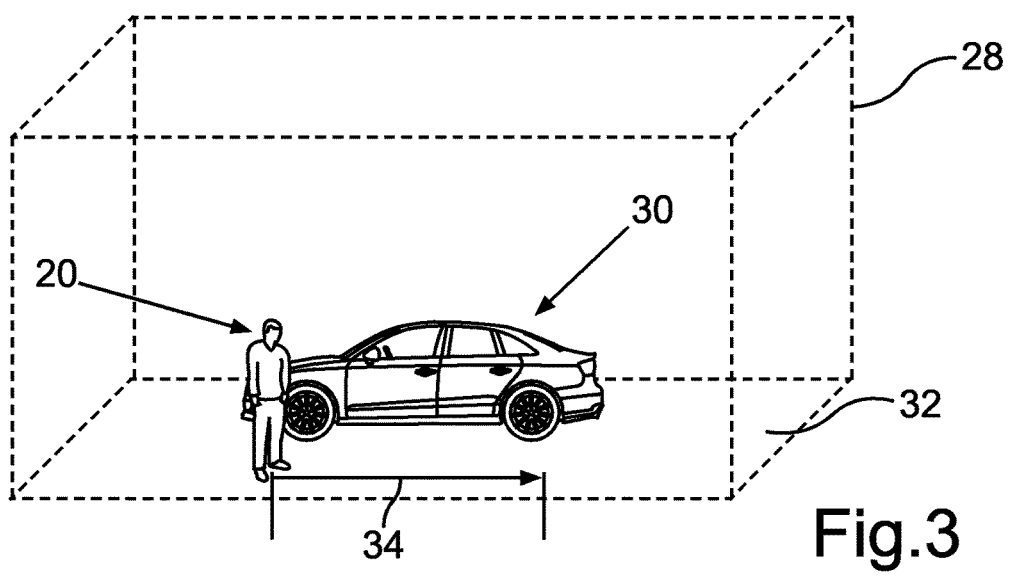
FIG. 3 is a schematic perspective view of virtual surroundings displayed by the virtual-reality glasses, a virtual motor vehicle being disposed within the virtual surroundings, wherein a virtual observation position, from which the person peers at the virtual surroundings through the virtual-reality glasses, is illustrated schematically.

FIG. 3 shows virtual surroundings 28 in a schematic perspective view. A virtual motor vehicle 30 is arranged within the virtual surroundings 28. The virtual surroundings 28, together with the virtual motor vehicle 30, are displayed by using the virtual-reality glasses 12. The person 20 is only illustrated within the virtual surroundings 28 for illustrative purposes in order to denote a virtual observation position of the person 20 that is not denoted in any more detail, the virtual surroundings 28 and hence also the virtual motor vehicle 30 being displayed through the virtual-reality glasses 12 to the person from the virtual observation position. If the person 20 moves in the real inspection area 22 of the capture space 18, the person 20 moves virtually within the virtual surroundings 28 in a virtual inspection area 32. Here, the dimensions of the virtual inspection area 32 can be substantially larger than the dimensions of the real inspection area 22. However, as already mentioned previously, a change in position of the person 20 can only be captured reliably for as long as the person 20, together with the virtual-reality glasses 12, is situated within the capture space 18. Thus, should the capture space 18 be relatively small in comparison with the virtual dimensions of the virtual motor vehicle 30, a problem that may arise is that the person 20 cannot go around the displayed virtual motor vehicle 30 without necessarily leaving the capture space 18 in the process. In order to counteract this problem, provision is made for real movements of the person 20 to be implemented differently within the virtual surroundings 28 depending on whether the person 20 is moving in the portion 24 or in the inner region 26.

A velocity at which the person 20 undertakes a change in position within the capture space 18 is captured continuously. Should a change in position of the person 20 be captured within the predetermined portion 24, a virtual velocity which is greater by a predetermined factor than the captured real velocity of the person 20 is predetermined. Thereupon, the virtual observation position within the virtual surroundings 28 is changed according to the predetermined virtual velocity, wherein the virtual motor vehicle 30 disposed within the virtual surroundings 28 is displayed in the meantime from the changing virtual observation position by using the virtual-reality glasses 12. By way of example, provision can be made for the factor to be predetermined as the value 2. Thus, if the person 20 moves at 4 km/h on the portion 24, this movement is implemented at 8 km/h within the virtual surroundings 28.

However, should the change in position of the person 20 be captured within the inner region 26, a second virtual velocity is predetermined, the second virtual velocity corresponding to the actually captured real velocity of the person 20. In this case, the virtual observation position within the virtual surroundings 28 is changed according to the predetermined second virtual velocity, wherein the virtual motor vehicle 30 disposed within the virtual surroundings 28 is once again displayed in the meantime from the changing virtual observation position by using the virtual-reality glasses 12. Thus, if the person 20 moves in the inner region 26, their changes in position are implemented one-to-one within the virtual surroundings 28. Thus, if the person 20 moves at 4 km/h once again, for example, this movement is likewise implemented at 4 km/h within the virtual surroundings 28.

Here, provision can be made for a portion, not illustrated in any more detail here, corresponding to the predetermined portion 24 to be displayed within the virtual surroundings 28 by using the virtual-reality glasses 12. Thus, when the person 20 wears the virtual-reality glasses 12, they can always identify where they have to move if they desire an accelerated movement or an entirely normal movement within the virtual surroundings 28. The respective changes in the virtual observation position in this case occur synchronously in time with the real change in the position of the person 20. A virtual movement direction 34, along which the change in the virtual observation position takes place, is predetermined in this case in such a way that the virtual movement direction corresponds to a movement direction 36 of the person 20 in reality. By way of example, if the person 20 thus moves to the right in reality, the person 20 likewise moves to the right within the virtual surroundings 28. Should the person 20 move in the portion 24, they merely cover a greater distance within the virtual surroundings 28 than they do in actual fact in reality. For as long as a person 20 moves within the inner region 26, these movements are implemented one-to-one in the virtual surroundings 28. The factor according to which the real movement velocity is increased in the virtual surroundings 28 can be predetermined here depending on, for example, the virtual dimensions of the virtual motor vehicle 30. It is advantageous if this factor is predetermined to be ever greater, the greater the virtual dimensions of the virtual motor vehicle 30 in the horizontal direction are in relation to the dimensions of the virtual inspection area 32. Independently of the size of the real inspection area 20, this can ensure that the person 20 can go around the displayed virtual motor vehicle 30—independently of the dimensions of the virtual motor vehicle 30—within the virtual surroundings 28 without leaving the capture space 18 in the process.

Thus, the explained method for operating the virtual-reality system 10 and the virtual-reality system 10 provide a solution by which a wearer of the virtual-reality glasses 12 can also comfortably virtually explore relatively large virtual surroundings 28 without leaving a capture space 18 in the case of restricted spatial conditions of the capture space 18.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating a virtual-reality system, comprising:
   capturing a velocity at which a person wearing virtual-reality glasses moves within a capture space;
   when the person wearing the virtual-reality glasses moves within a predetermined portion of the capture space, predetermining a virtual velocity that is greater than the captured velocity of the person by a predetermined factor;
   changing a virtual observation position within virtual surroundings according to the predetermined virtual velocity to enable the person wearing the virtual-reality glasses to virtually move around a virtual object disposed within the virtual surroundings without leaving the capture space, the virtual object having relatively large virtual dimensions in comparison with real dimensions of the capture space; and
   displaying, by using the virtual-reality glasses, the virtual object from the changing virtual observation position while the person wearing the virtual-reality glasses moves within the virtual surroundings at the predetermined virtual velocity.

2. The method as claimed in claim 1, further comprising:
   when the person wearing the virtual-reality glasses moves outside of the predetermined portion of the capture space, predetermining a second virtual velocity which corresponds to the captured velocity of the person;
   changing the virtual observation position according to the predetermined second virtual velocity; and
   displaying, by using the virtual-reality glasses, the virtual object from the changing virtual observation position while the person wearing the virtual-reality glasses moves within the virtual surroundings at the predetermined second virtual velocity.

3. The method as claimed in claim 1, wherein
   the capture space includes an inner region and an outer region which surrounds the inner region, and
   the predetermined portion corresponds to the outer region.

4. The method as claimed in claim 1, further comprising displaying, by the virtual-reality glasses, a virtual portion corresponding to the predetermined portion within the virtual surroundings.

5. The method as claimed in claim 1, wherein changing the virtual observation position occurs at least substantially synchronously in time with the movement of the person within the capture space.

6. The method as claimed in claim 1, wherein a value of the predetermined factor increases as the virtual dimensions of the virtual object increases.

7. The method as claimed in claim 1, wherein a value of the predetermined factor increases as the virtual dimensions of the virtual object relative to the real dimensions of the capture space increases.

8. The method as claimed in claim 1, wherein a virtual movement direction, along which the virtual observation position is changed, corresponds to a movement direction of the person within the capture space.

9. The method as claimed in claim 1, wherein predetermining the virtual velocity comprises:
increasing only a horizontal velocity component of the captured velocity of the person by the predetermined factor to determine a horizontal velocity component of the predetermined virtual velocity, and
using a vertical velocity component of the captured velocity of the person as a vertical velocity component of the predetermined virtual velocity.

10. A virtual-reality system, comprising
virtual-reality glasses;
a capture device to capture a velocity at which a person wearing the virtual-reality glasses moves within a capture space; and
a controller configured to:
predetermine a virtual velocity which is greater than the captured velocity of the person by a predetermined factor when the person wearing the virtual-reality glasses moves within a predetermined portion of the capture space;
change a virtual observation position within virtual surroundings according to the predetermined virtual velocity to enable the person wearing the virtual-reality glasses to virtually move around a virtual object disposed within the virtual surroundings without leaving the capture space, the virtual object having relatively large virtual dimensions in comparison with real dimensions of the capture space, and
control the virtual-reality glasses to display the virtual object from the changing virtual observation position while the person wearing the virtual-reality glasses moves within the virtual surroundings at the predetermined virtual velocity.

11. The virtual-reality system as claimed in claim 10, wherein the controller is further configured to:
predetermine a second virtual velocity which is less than the predetermined virtual velocity when the person wearing the virtual-reality glasses moves outside of the predetermined portion of the capture space,
change the virtual observation position according to the predetermined second virtual velocity, and
control the virtual-reality glasses to display the virtual object from the changing virtual observation position while the person wearing the virtual-reality glasses moves within the virtual surroundings at the predetermined second virtual velocity.

12. The virtual-reality system as claimed in claim 10, wherein
the capture space is a space within which a position of the wearer of the virtual-reality glasses is capturable by the capturing device,
the capture space is defined by the controller to include an inner region and an outer region which surrounds the inner region, and
the predetermined portion corresponds to the outer region.

13. The virtual-reality system as claimed in claim 12, wherein the controller is further configured to:
predetermine a second virtual velocity which is less than the predetermined virtual velocity when the person moves from the outer region to the inner region of the capture space,
change the virtual observation position according to the predetermined second virtual velocity, and
control the virtual-reality glasses to display the virtual object from the changing virtual observation position while the person wearing the virtual-reality glasses moves within the virtual surroundings at the predetermined second virtual velocity and remains within the inner region of the capture space.

14. The virtual-reality system as claimed in claim 12, wherein the virtual-reality glasses is configured to display a virtual portion corresponding to the outer region so as to visually inform the person wearing the virtual-reality glasses where an accelerated movement within the virtual surroundings at the predetermined virtual velocity occurs.

15. The virtual-reality system as claimed in claim 10, wherein
the virtual object is a motor vehicle including at least one of an automobile or a truck having a larger size than automobile, and
the controller is configured to set the predetermined factor to a first value when the virtual object is the automobile, and is configured to set the predetermined factor to a second value when the virtual object is the truck, the second value being greater than the first value.

16. The virtual-reality system as claimed in claim 10, wherein the controller is configured to set the predetermined factor to a first value when a size of the virtual dimensions of the virtual object compared to the real dimensions of the capture space is a first ratio, and is configured to set the predetermined factor to a second value when the size of the virtual dimensions of the virtual object compared to the real dimensions of the capture space is a second ratio, the second value being greater than the first value when the second ratio is greater than the first ratio.

17. The virtual-reality system as claimed in claim 10, wherein the controller is configured to predetermine the virtual velocity by:
increasing a horizontal velocity component of the captured velocity of the person by the predetermined factor to determine a horizontal velocity component of the predetermined virtual velocity, and
using a vertical velocity component of the captured velocity of the person as a vertical velocity component of the predetermined virtual velocity.

\* \* \* \* \*